US010927910B2

(12) United States Patent
Ritter (10) Patent No.: US 10,927,910 B2
(45) Date of Patent: Feb. 23, 2021

(54) BRAKE SYSTEM AND CONTROL METHOD THEREOF

(71) Applicant: AKEBONO BRAKE INDUSTRY CO., LTD., Tokyo (JP)

(72) Inventor: George Ritter, Royal Oak, MI (US)

(73) Assignee: AKEBONO BRAKE INDUSTRY CO., LTD, Tokyo (JP)

(*) Notice: Subject to any disclaimer, the term of this patent is extended or adjusted under 35 U.S.C. 154(b) by 36 days.

(21) Appl. No.: 16/278,219

(22) Filed: Feb. 18, 2019

(65) Prior Publication Data

US 2020/0263748 A1 Aug. 20, 2020

(51) Int. Cl.
*F16D 65/18* (2006.01)
*F16D 55/28* (2006.01)
*F16D 55/36* (2006.01)
F16D 125/46 (2012.01)
F16D 66/00 (2006.01)
F16D 55/00 (2006.01)

(52) U.S. Cl.
CPC .............. *F16D 65/18* (2013.01); *F16D 55/28* (2013.01); *F16D 55/36* (2013.01); F16D 2055/0091 (2013.01); F16D 2066/003 (2013.01); F16D 2125/46 (2013.01)

(58) Field of Classification Search
CPC ...... F16D 65/18; F16D 55/28; F16D 2121/18; F16D 2121/24; F16D 2125/40; F16D 2125/46; F16D 2129/10; F16D 2066/003; F16D 55/36; F16D 55/30
See application file for complete search history.

(56) References Cited

U.S. PATENT DOCUMENTS

| | | | |
|---|---|---|---|
| 6,095,293 A | 8/2000 | Brundrett et al. | |
| 7,721,853 B2 | 5/2010 | Chittka | |
| 8,616,348 B2 | 12/2013 | Winkler et al. | |
| 8,671,789 B2 | 3/2014 | Osterlaenger et al. | |
| 8,676,409 B2* | 3/2014 | Takeda | B60T 13/741 701/7 |
| 8,794,720 B2* | 8/2014 | Schumann | B60T 7/108 303/174 |
| 8,875,851 B2 | 11/2014 | Winkler | |
| 9,453,544 B2* | 9/2016 | Jung | F16D 65/22 |
| 9,527,584 B2 | 12/2016 | Rehfus et al. | |
| 9,593,752 B2 | 3/2017 | Adler et al. | |
| 9,599,202 B2 | 3/2017 | Brown | |
| 2005/0082999 A1 | 4/2005 | Ether | |
| 2011/0120247 A1 | 5/2011 | Osterlaenger et al. | |
| 2013/0062148 A1* | 3/2013 | Park | F16D 65/18 188/72.1 |
| 2014/0345989 A1* | 11/2014 | Oshio | B60T 13/746 188/162 |
| 2015/0330487 A1 | 11/2015 | Wilhelm et al. | |
| 2015/0369317 A1* | 12/2015 | Choe | F16D 66/00 701/70 |
| 2016/0032995 A1* | 2/2016 | Nishino | F16D 55/226 188/72.3 |

(Continued)

*Primary Examiner* — Thomas J Williams
(74) *Attorney, Agent, or Firm* — The Dobrusin Law Firm, P.C.

(57) ABSTRACT

A method that includes monitoring a motor characteristic; and determining an actuator of a brake system has reached a retracted position after the motor characteristic has reached or exceeded a predetermined threshold.

18 Claims, 6 Drawing Sheets

(56) References Cited

U.S. PATENT DOCUMENTS

| | | | |
|---|---|---|---|
| 2016/0033888 A1* | 2/2016 | Tamagaki | G03G 9/09321 |
| | | | 430/110.2 |
| 2017/0355356 A1* | 12/2017 | Okada | B60T 13/74 |
| 2017/0356514 A1* | 12/2017 | Kim | F16D 65/18 |
| 2018/0058553 A1* | 3/2018 | Kick-Rodenbuecher | ............ |
| | | | F16H 25/2015 |
| 2020/0263748 A1* | 8/2020 | Ritter | F16D 65/18 |

* cited by examiner

BRAKE SYSTEM AND CONTROL METHOD THEREOF

FIELD

These teachings relate to a brake system and to a method of controlling a brake system.

BACKGROUND

Some brake systems have one or more actuators for converting torque into a linear force. The linear force may be configured to move a braking member against a braking surface to create a clamping force. In vehicular applications, the clamping force may be used to slow, stop, or prevent movement of a road wheel.

In some configurations, it may be desirable to have a brake system and/or control method for accurately determining when the actuator has reached or has been moved into a particular position. For example, it may be desirable to have a brake system and/or control method for determining when the actuator has reached and/or has been moved into a certain position, such as an extended position and/or a retracted position. In the extended position, a gap may be defined between a nut and a spindle stop. In the extended position, a leading or forward end of the nut may be in contact with a bottom pocket wall of the piston pocket. In the retracted position, the nut may be contact with the spindle stop.

In some configurations, it may be desirable to have a brake system and/or control method for accurately determining when another component of the brake system has reached or has been moved into a particular position. The brake component may be a brake pad. For example, it may be desirable to have a brake system and/or control method for determining when the brake pad has reached and/or has been moved into a certain position, such as an extended position, where the brake pad is in contact with a braking surface; or a retracted position where a gap is defined between the brake pad and the braking surface.

SUMMARY

These teachings provide a brake system. These teachings provide a control method for controlling a brake system. These teachings provide a brake system and a method of controlling the brake system.

These teachings provide a brake system and/or control method for accurately determining when one or more components of a brake system have reached and/or have been moved into a particular position.

The brake component may be an actuator. The actuator may comprise a spindle and a nut. These teachings provide a control method for determining when the actuator has reached and/or has been moved into a certain position, such as an extended position and/or retracted position. In the extended position, a gap may be defined between the nut and a spindle stop. The gap may be defined between a trailing or rear end of the nut and the spindle stop or spindle flange. In the extended position, a leading or forward end of the nut may be in contact with a bottom pocket wall of the piston pocket. In the retracted position, the nut may be contact with the spindle stop. In the retracted position, the trailing or rear end of the nut may be contact with the spindle stop.

By determining when the actuator is in the retracted position, chances of over stroking the actuator may be reduced or eliminated. Over stroking the actuator may undesirably cause damage to the actuator and/or to the motor. An over stroke condition may occur after the nut or a trailing or rear end of the nut contacts the spindle stop, and the spindle continues to be rotated, which may then result in damage to the spindle and/or the nut, the motor, the brake piston, the brake system, or a combination thereof. For example, if the actuator is a ball nut assembly (BNA), continued rotation of the spindle after the nut and spindle are in contact may undesirably cause one or more springs or holding members to buckle, which may render the ball nut assembly inoperable, loss of efficiency, or both.

The brake component may be a braking member, such as a brake pad or brake shoe. These teachings provide a control method for determining when the brake pad or brake shoe has reached and/or has been moved into a certain position, such as an unclamped position: where a gap is defined between the brake pad or brake shoe and a brake rotor or brake drum, respectively; a clamped position: where the brake pad or brake shoe is in contact with the brake rotor or brake drum, respectively; or a position therebetween. For example, by determining when or after the brake pad or brake shoe is in a clamped position, chances of over stroking an actuator used to move the brake pad or brake shoe into the clamping position may be reduced or eliminated.

These teachings may find use during servicing of a brake system. For example, when a component of the brake system requires repair or replacement, the method according to these teachings may be utilized to bring one or more of the components of the brake system into a known position. After service has been completed, the method according to these teachings may be utilized to bring one or more components of the brake system into another known position.

DETAILED DESCRIPTION

The brake system disclosed herein may be a system or assembly for creating a clamping force. The brake system may function to, may be configured to, or may be adapted or enabled to create a clamping force to slow, stop, and/or maintain a vehicle in a stopped position. The brake system may be an opposing brake system (i.e., a fixed caliper brake system) or a floating brake system (i.e., a floating caliper). The brake system may be a disc brake system. The brake system may be a drum brake system and/or a drum-in-hat brake system. The brake system may be a service brake system. The brake system may be a parking brake system. The brake system may be a combined service and parking brake system. The brake system may be used in motor vehicles, like sedans, pick-up trucks, high performance vehicles, motorcycles, all-terrain vehicles, and the like.

The brake system may be used in non-vehicular applications, like amusement park rides, paper mill winders, lathes, and the like.

The clamping force may be a force that, when coupled with a brake pad coefficient of friction, functions to decelerate, slow, stop, and/or prevent movement or rotation of a brake rotor, road wheel, and/or a vehicle. The clamping force may be created during a standard or service brake apply. The clamping force may be created during a parking brake apply.

One or more brake pads may be used to create the clamping force. The clamping force can be created by converting the kinetic energy of the vehicle into thermal energy by frictionally engaging the friction material of one or more brake pads with one or more sides of the brake rotor. The one or more brake pads may include one or more features (i.e. ears, projections, etc.) that may engage or be engaged by a brake caliper, a support bracket, or both to maintain the location of the brake pads within the brake system and relative to the brake rotor.

The brake caliper may function to support one or more the components of the brake system. For example, the brake caliper may include one or more supports configured to engage and/or support the one or more brake pads. The brake caliper may include one or more mounting locations for the motor to be mounted or connected to the brake caliper. The brake caliper may provide for one or more brake pads, or, preferably, two or more brake pads to move relative to the brake rotor. The brake caliper may be connected to any non-rotating or moving part of a vehicle, like a support or a knuckle or frame.

The brake caliper may have one or more caliper bores. Each piston caliper may define an at least partially hollow region in the brake caliper that is configured to receive and support a brake piston. The brake caliper may have any number of caliper bores located on either or both sides of a brake rotor. The brake piston may move inside the caliper bore during a brake apply and a brake release.

The brake system may have one or more brake pistons. The one or more brake pistons may be moved in a apply direction, which may function to move a brake pad, or a corresponding end of brake pad, towards the brake rotor to create the clamping force. The one or more brake pistons may be moved in a release direction, which may function to allow a brake pad, or a corresponding end of brake pad to move away from a brake rotor to release the clamping force.

During a brake apply, a parking brake apply, or both, to create clamping force, the brake piston may be moved by moving the actuator in the apply direction. To release the clamping force, the brake piston can be moved by actuating the actuator in an opposing release direction. The brake piston may include a closed end selectively engaging the pressure plate of a brake pad and an open end defining an opening into a brake piston pocket.

The brake piston pocket may function to receive at least a portion of an actuator. The brake piston pocket may be a cup or recess formed into an end of a brake piston. The brake piston pocket may include a bottom wall at the end or bottom of the brake piston pocket and an opposing open end. The actuator may be inserted into the piston pocket through the open end. A forward or leading end of the nut may contact the bottom wall during movement of the nut and then push the brake piston in the apply direction to create clamping force.

The brake system may comprise one or more actuators. The one or more actuators may function to transfer a torque output from a motor into a linear or axial force to move the one or more brake pistons. The one or more actuators may be a high-efficiency device such as a ball screw, a roller screw, or a ball ramp, for example. The one or more actuators may be a low-efficiency device, like a lead screw and nut. The one or more rotary to linear stage mechanisms may generally include a spindle and a nut.

The spindle may be a screw member that is rotated about an axis via a torque producing mechanism such as a motor. The motor may be an electric motor. The spindle may include an input portion in communication with the motor or a gear train for receiving torque from the motor. The spindle may include a threaded portion configured to threadably engage a nut. When the spindle is rotated in an apply direction (i.e., clockwise or counterclockwise), the nut moves axially along a length of the spindle in an apply direction. When the spindle is rotated in a release direction (i.e., clockwise or counterclockwise), the nut moves axially along a length of the spindle in an opposite, release direction.

The spindle includes a spindle stop. The spindle stop may be any portion of the spindle that comes into contact with the nut when the nut is fully retracted in the release direction. The spindle stop may be a planar face or wall of the spindle. The spindle stop may be one or more fingers or projections that extend from a planar face or wall of the spindle. The spindle stop may be a flange of the spindle.

The nut may threadably engage the spindle. Rotation of the spindle causes the nut to move axially along a length of the spindle. The nut is restricted or prevented from rotating about an axis of the spindle, or about the spindle itself. The nut may be keyed to the piston pocket to prevent it from rotating about the spindle or spindle axis.

The nut may include a leading end that is configured to engage the bottom pocket wall of the piston pocket to move or push the brake piston in an apply direction. The nut includes a trailing end that opposes the leading end. The trailing end is configured to contact or engage the spindle or spindle stop when the nut is fully retracted in the release direction. The nut may include a nut stop that is configured to contact or engage the spindle or spindle stop when the nut is fully retracted in the release direction. The nut stop may be a planar wall or face of the trailing end of the nut. The nut stop may be one or more fingers or projections that extend from a planar face or wall of the nut.

Figure 1:
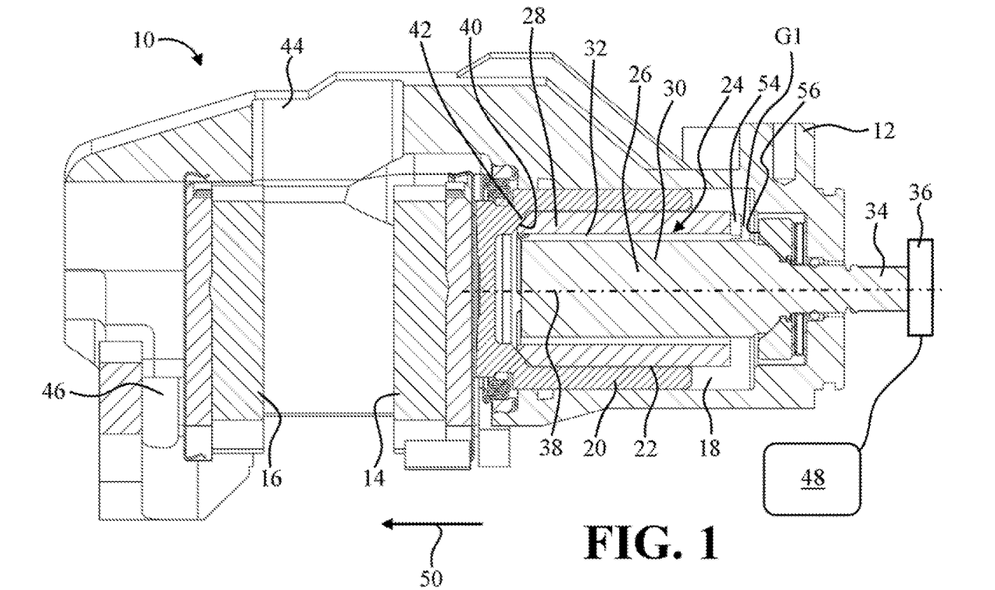
FIG. 1 is a cross-sectional view of a brake system that includes an actuator in an extended position.

FIG. 1 illustrates a brake system 10. The brake system 10 is used to create a clamping force during a brake apply. The brake apply may be during regular or service braking to slow or stop a vehicle or road wheel. The brake apply may be during application of the parking brake to prevent movement of the vehicle or road wheel.

The brake system 10 comprises a brake caliper 12 that is configured to support an inboard brake pad 14 and an outboard brake pad 16. The brake caliper 12 comprises a caliper bore 18 that is configured to support therein a brake piston 20. The brake piston 20 comprises a piston pocket 22.

The brake system 10 comprises an actuator 24. The actuator 24 comprises a spindle 26 and a nut 28. An outer surface of the spindle 26 comprises a threaded portion 30, and an inner surface of the nut 28 comprises a mating threaded portion 32 that is configured to threadably engage the threaded portion 30 of the spindle 26. In some configurations, the actuator 24 may be a ball screw or ball nut assembly that includes ball bearings provided between the spindle 26 and the nut 28.

The spindle 26 comprises an input portion 34 that is in communication with a motor 36. The motor 36 is configured to generate torque, which is transferred directly to the input portion 34 of the spindle 26, or indirectly to the input portion 34 of the spindle 26 via one or more torque transferring mechanisms, gears, or gear trains.

Torque acting on the input portion 34 of the spindle 26 functions to cause the spindle 26 to rotate about its longitudinal axis 38 in either an apply direction or in a release direction. Rotation of the spindle 26 about the axis 38 causes the nut 28 to axially move along the longitudinal axis 38 in either a corresponding apply direction or release direction. The nut 28 is restricted or prevented from rotating about the axis 38. The spindle 26 is restricted or prevented from axially moving along the axis 38.

A controller 48 is in communication with the brake system 10 and/or motor 36. The controller 48 and/or brake system 10 may be configured to turn the motor 36 ON and turn the motor 36 OFF.

Before, during, or after a brake apply, the controller 48 and/or brake system 10 may be configured to read, monitor, record and/or interpret one or more motor characteristics of the motor 36. The one or more motor characteristics of the motor 36 may include: inrush current or input surge current, motor current, a change in motor current, motor voltage, a change in motor voltage, motor running or operating time, or a combination thereof.

Before, during, or after a brake apply, the controller 48 and/or brake system 10 may be configured to compare the one or more read, monitored, recorded and/or interpreted motor characteristics to one or more preprogramed, predetermined, and/o predefined motor characteristic thresholds, which may be stored in a memory associated with, connected to, and/or part of the brake system 10, controller 48, and/or vehicle system. Before, during, or after a brake apply, the controller 48 and/or brake system 10 may be configured to compare one or more read, monitored, recorded and/or interpreted motor characteristics to one or more motor characteristics that were previously read, monitored, recorded and/or interpreted in, during, or after a previous brake apply.

The brake system 10 and/or controller 48 may be configured to control the motor 36 based on the read, monitored, recorded, interpreted and/or compared motor characteristics. For example, based on the read, monitored, interpreted, recorded, and/or compared motor characteristics, the brake system 10 and/or controller 48 may be configured to turn the motor 36 OFF and/or ON; increase and/or decrease a run time of the motor 46; increase and/or decrease a torque output from the motor 36; increase and/or decrease a speed of the motor 36; or a combination thereof. Controlling the motor 36 in the foregoing ways results in controlling a position of the actuator 24 (i.e., relative position of the nut relative to the spindle).

Before, during, or after a brake apply, the brake system 10 and/or controller 48 may be configured to update, alter, change, verify, and/or modify the one or more preprogramed and/or predetermined motor characteristic thresholds based on a previous or subsequent motor characteristic reading, determination, and/or comparison. This may be desirable so that the motor 36 and/or brake system 10 can continue to efficiently operate over time, even as efficiency and/or components of the motor 36, actuator 24, and/or brake system 10 change due to wear and/or degradation.

The brake system 10 can be used to create a clamping force during a brake apply, which may be during application of the regular or service brake, or application of the parking brake. During the brake apply, the motor 36 is configured to generate torque, which is configured to cause the spindle 26 to rotate in an apply direction (clockwise or counterclockwise) about the longitudinal axis 38, which causes the nut 28 to move axially along the longitudinal axis 38 in an apply direction 50, towards a bottom pocket wall 40 of the piston pocket 22. Eventually, a forward or leading end 42 of the nut 28 will contact the bottom pocket wall 40 of the piston pocket 22. After contact is made between the forward or leading end 42 of the nut 28 and the bottom pocket wall 40 of the piston pocket 22, a gap G1 is defined between an opposing back end 53 (FIG. 3) of the nut 28 or a nut stop 54 and a spindle stop 56. The nut stop 54 may be a finger, or projection that extends from the back end 53 of the nut 28.

After contact is made between the forward or leading end 42 of the nut 28 and the bottom pocket wall 40 of the piston pocket 22, continued rotation of the spindle 26 in the apply direction, and thus continued movement of the nut 28 in the apply direction 50, causes the brake piston 20 to be pushed or moved in the apply direction 50 towards the inboard brake pad 14. Continued movement of the brake piston 20 in the apply direction 50 eventually causes the brake piston 20 to move or push the inboard brake pad 14 against a side of a braking surface to create friction or a clamping force. After contact is made between the inboard brake pad 14 and the braking surface, continued movement of the inboard brake pad 14 against the braking surface causes an opposite reaction force to act on a bridge 44 of the brake caliper 12, which causes one or more fingers 46 of the bridge 44 to pull the outboard brake pad 16 into contact with and against an opposite side of the braking surface to create friction or the clamping force.

Figure 2:
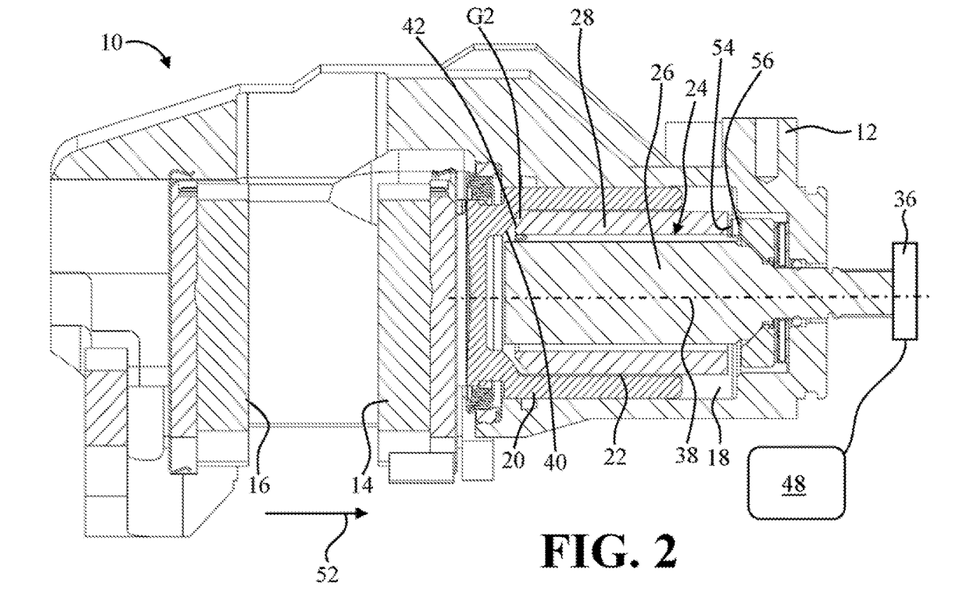
FIG. 2 is a cross-sectional view of a brake system that includes an actuator in a retracted position.

With additional reference to FIG. 2, the brake system 10 can be used to release the clamping force during a brake release, which may release of the regular or service braking, or release of the parking brake. During release, the motor 36 is configured to cause the spindle 26 to rotate about the longitudinal axis 38 in a release direction, which is opposite the direction that the spindle 26 is rotated when the spindle 26 is rotated in the apply direction (i.e., the other of the clockwise or counterclockwise direction).

Rotation of the spindle 26 in the release direction causes the nut 28 to move axially along the longitudinal axis 38 in a release direction 52, or away from the bottom pocket wall 40 of the piston pocket 22 until a gap G2 is defined between the forward or leading end 42 of the nut 28 and the bottom pocket wall 40 of the piston pocket 22. The brake piston 20 can then move back into the caliper bore 18 out of contact with the inboard brake pad 14, thus allowing the brake pads 14, 16 to move out of contact with the braking surface to release the clamping force.

Due to thinning or wear of the lining or friction material of one or both of the brake pads 14, 16 that occurs over time from being pressed against the braking surface, brake rotor, or brake drum, the brake piston 20 moves further out of the caliper bore 22 over time in the apply direction 50. This also means that nut 28 displacement, or the position of the nut 28 on or along a length of the spindle 26 relative to the spindle 26 also increases or changes over time. That is, the gap defined between the rear end 53 of the nut 28 or nut stop 54 and the spindle stop 56 or spindle flange 57 increases over time.

When servicing or replacing worn brake pads 14, 16, the brake piston must be reset, moved, retracted, or pushed back into the caliper bore 22 to accommodate the new brake pads 14, 16. This means that the nut 28 must also be reset, moved, or retracted in a direction towards the spindle stop 56

Resetting the brake piston 20 means moving, pushing, or retracting the brake piston 20 back into the caliper bore 22 in the release direction 52 or in the direction away from the inboard brake pad 14.

Resetting the nut 28 or the actuator 24 or moving the nut 28 or actuator 24 into the retracted position means retracting or moving the nut 28 in the release direction 52 away from the bottom pocket wall 40 of the piston pocket 22. Resetting the nut 28 or the actuator 24 or moving the nut 28 or actuator 24 into the retracted position means retracting or moving the nut 28 in the release direction 52 until a back or rear end 53 of the nut 28 or nut stop 54 contacts the spindle 28 or spindle stop 56 or spindle flange 57. Resetting the nut 28 or the actuator 24 may be accomplished by rotating the spindle 26 in the release direction.

Figure 3:
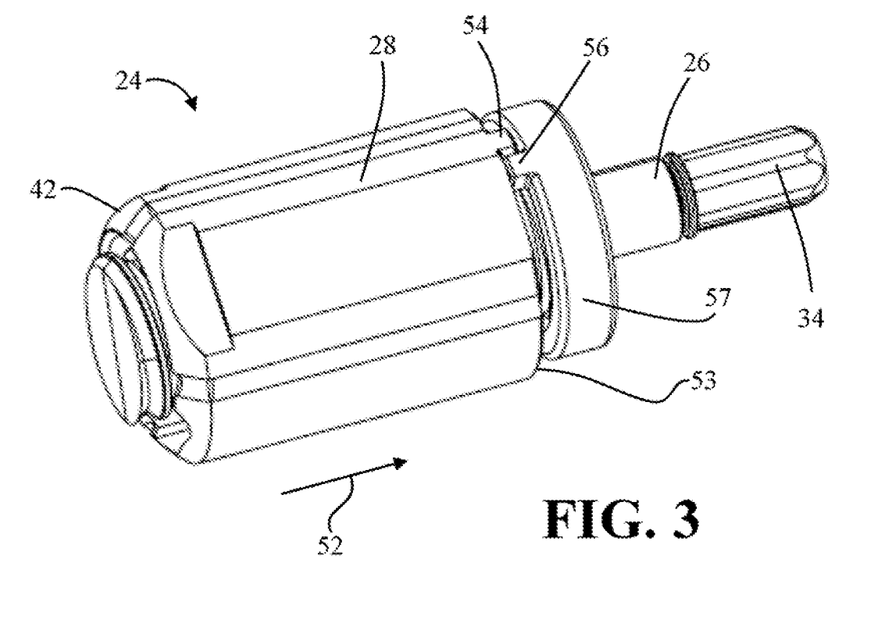
FIG. 3 is a perspective view of an actuator.

Referring now to FIG. 3, the actuator 24 comprises a nut 28 and a spindle 26. The nut 28 comprises a forward or leading end 42 and an opposing rear or trailing end 53. The rear or trailing end 53 may be the nut stop, or the nut stop may be a finger or projection 54 extending from the rear or trailing end 53. The nut stop may be any surface of the nut 28 that first contacts the spindle stop when the nut 28 is moved in the release direction 52 so that further movement of the nut 28 in the release direction 52 is prevented.

The spindle 26 comprises an input portion 34 and an end or flange 57. The end or flange 57 may be a spindle stop, or the spindle stop may be a finger or projection 56 extending from end or flange 57. The spindle stop may be any surface of the spindle 26 that first contacts the nut stop when the nut 28 is moved in the release direction 52 so that further movement of the nut 28 in the release direction 52 is prevented.

The nut 28 or the actuator 24 can be reset or moved into the retracted position by rotating the spindle 26 via the motor 36 (FIGS. 1 and 2) in the release direction. Doing so, causes the nut 28 to move axially in the release direction 52 until the nut stop 54 comes into contact with the spindle stop 56. During this movement, one or more motor characteristics of the motor 36 can be read, monitored, evaluated, recorded, processed, and/or compared by the brake system 10 and/or controller 48.

During retracting of the actuator 24, it may be desirable to know if and/or when the nut 28 or nut stop 54 contacts the spindle 26 or spindle stop 56 and/or when the nut 28 is in the retracted position so that torque supply from the motor 36 to the spindle 26 can be discontinued at that time. If, for example, the motor 36 continues to supply torque to the spindle 26 after the nut 28 or nut stop 54 contacts the spindle 26 or spindle stop 56, damage may occur to the motor 36, actuator 24, spindle 26, nut 28, brake piston 20 and/or brake system 10. Therefore, it may be desirable to know as soon as the nut stop 54 contacts the spindle stop 56, or shortly thereafter so that the brake system 10, controller 48, and/or motor 36 can respond accordingly by stopping the motor 36 for example.

Figure 4:
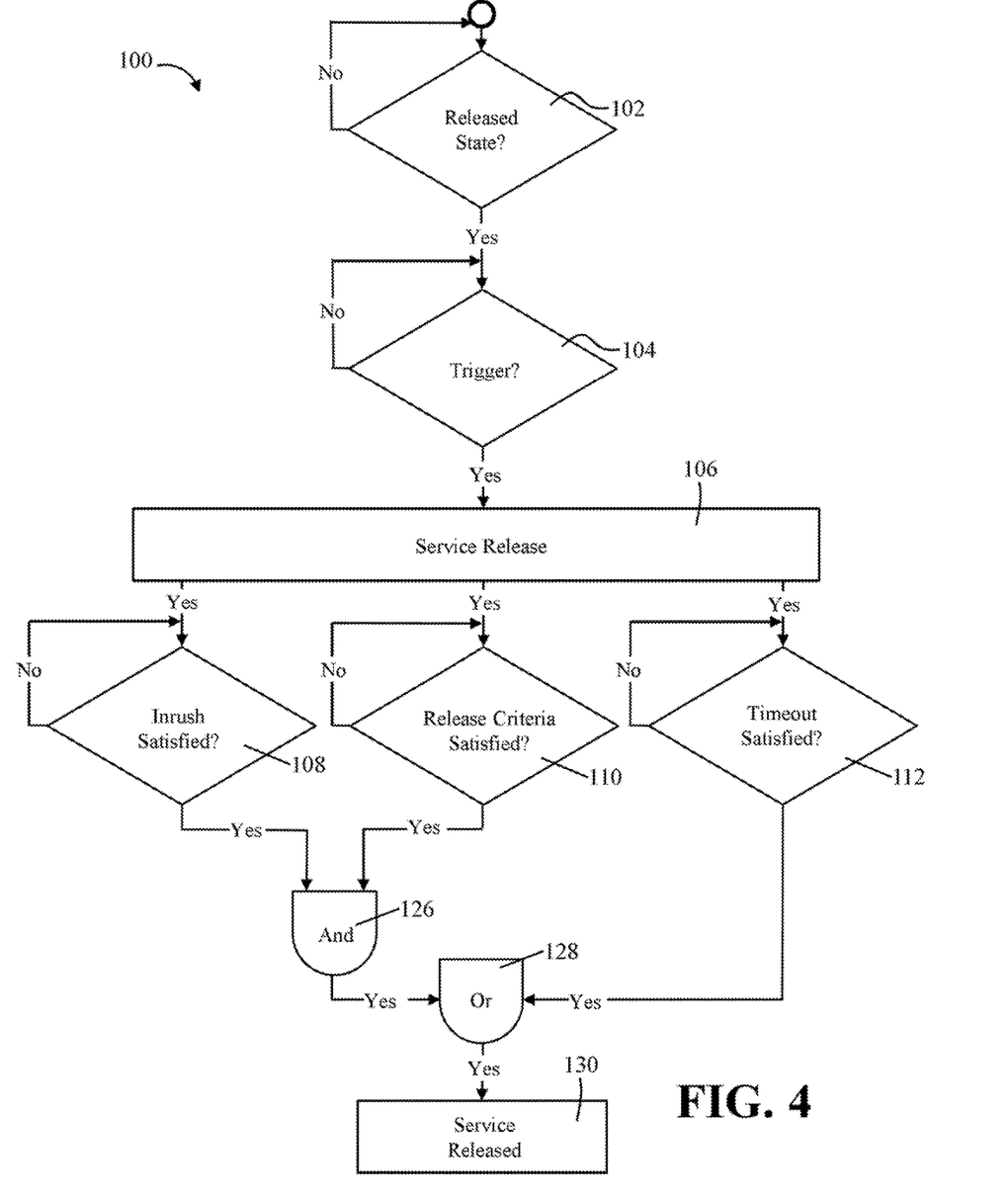
FIG. 4 is a flow chart illustrating a method of controlling a brake system.

Referring now to FIG. 4, a method 100 can be used to determine if and/or when the actuator 24 or the nut 28 is in the retracted position. In other words, the method 100 can be used to determine if and/or when the nut stop 54 contacts the spindle stop 56, or shortly after the nut stop 54 contacts the spindle stop 56. It is understood, one or more of the method steps in this entire disclosure can be omitted, repeated, and/or combined with other method steps. One or more of the method steps can be performed in any order. The method 100 may be performed or executed by the brake system 10, the controller 48, and/or another computer or processor associated with the brake system 10, the vehicle, or both.

The method 100 includes a step 102. At step 102, the method 100, the brake system 10 and/or the controller 48 are configured to determine whether the brake system 10 is in a released state. In the released state 102, the motor 36 is turned OFF, is not generating torque, is not supplying torque to the spindle 26 or actuator 24, or a combination thereof. In the released state 102, the spindle 26 is not rotating. In the released state 102, the brake system 10 is not generating a clamping force. In the released state 102, the nut stop 54 is not in contact with the spindle stop 56. In the released state 102, a gap may be defined between the nut stop 54 and the spindle stop 56. In the released state 102, the actuator 24 is not in a retracted position.

If the method 100, the brake system 10 and/or the controller 48 determines that the brake system 10 is not in the released state, the method 100, the brake system 10 and/or the controller 48 is configured to perform one or more steps, functions, or processes to put the brake system 10 into the released state. For example, the method 100, the brake system 10 and/or the controller 48 may be configured to turn the motor 36 OFF, stop rotating the spindle 26, move the nut stop 54 out of contact with the spindle stop 56, or a combination thereof. After the method 100, the brake system 10 and/or the controller 48 determines that the brake system 10 is in the released state, the method 100 proceeds to step 104.

The method 100 includes a step 104. At step 104, the method 100, the brake system 10 and/or the controller 48 looks for a trigger. The trigger may be required for the method 100 to move to the next step 106. The trigger may include one or more steps or a sequence of steps or an action(s) that must be performed by a user or technician for the method 100 to move to the next step 106. The trigger may be pre-set or defined by the OEM. For example, the trigger may include one or more steps or deliberate acts like moving the ignition key into a particular position (i.e., into the ON or AUX position, for example); depressing the brake pedal or pumping the brake pedal a certain number of times; depressing the gas pedal or pumping the gas pedal a certain number of times; depressing or activating one or more switches or buttons a certain number of times (for example, the parking brake switch); or a combination thereof. The method 100, the brake system 10 and/or the controller 48 will wait until the trigger has been received before moving to step 106.

After the trigger has been received in step 104, the method 100 proceeds to step 106 or the service release step 106. In or during the service release step 106, the method 100, the brake system 10 and/or the controller 48 may be configured to turn ON the motor 36 so that the motor 36 begins generating a release direction torque. In or during the service release step 106, the torque from the motor 36 may be supplied or provided to the actuator 24 or to the spindle 26. The torque from the motor 36 is configured to cause the spindle 26 to rotate in the release direction, which causes the nut 28 to axially move along a length of the spindle 26 without rotating in the release direction 52 towards the spindle stop 56 (FIG. 3).

As part of the service release step 106, the method 100 includes a step 108 of determining whether inrush has been satisfied; a step 110 of determining whether or more release criteria have been satisfied; and a step 112 of determining whether a timeout been satisfied.

As will be discussed further below, both steps 108 and 110 must be satisfied at step 126 before the method 100 will proceed to the step 128. Alternatively, the method 100 may proceed to the step 128 if the step 112 is satisfied before both steps 108, 110 are satisfied.

During the service release operation 106, the brake system 10, controller 48, and/or method 100 is configured to monitor the motor 36 and/or one or more motor characteristics of the motor 36. The one or more motor characteristics of the motor 36 may include: inrush current or input surge current, motor current, a change in motor current, motor voltage, a change in motor voltage, motor running or operating time, or a combination thereof.

Figure 5:
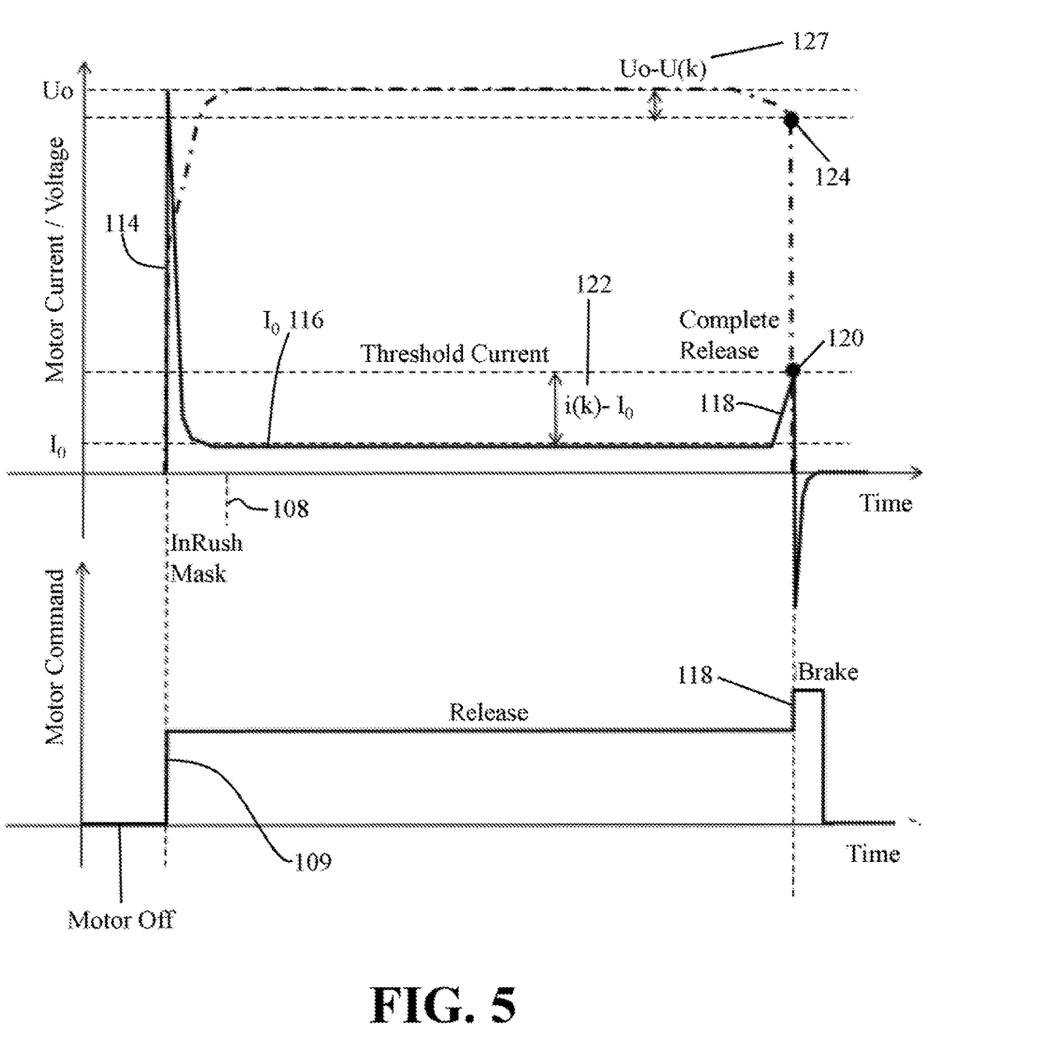
FIG. 5 is a graph illustrating motor characteristics during the controlling of a brake system with the method of FIG. 4.

With additional reference to FIGS. 3 and 5, to generate release direction torque when or after the motor 36 is initially turned ON at 109, the motor 36 may draw or require an inrush of current, which may cause the current to increase or spike, which is illustrated at 114 in FIG. 5. The inrush current is a surge or maximum instantaneous input current drawn by the motor 36 from a power source, like a vehicle battery, when the motor 36 is first turned ON.

After the motor 36 begins generating the release direction torque and rotating the spindle 26 in the release direction, the current draw will drop to a current running range $I_0$, which is identified at 116 in FIG. 5. While the motor 36 draws current in the current running range $I_0$ 116, the spindle 26 is being rotated in the release direction, and the nut 28 is being moved in the release direction 52 towards the spindle stop 56.

At step 108, the method 100, the brake system 10 and/or the controller 48 is configured to determine when or whether the inrush has ended or has been satisfied (i.e., when or whether the current draw has dropped from the inrush 114 to the current running range $I_0$ at 116). This decision or determination may be time based. That is, the brake system 10 and/or the controller 48 may comprise a clock or timer that is configured to begin running after the motor 36 is initially turned ON at step 106. After a predetermined amount of time or a threshold time has expired after the motor 36 is turned ON, the method 100, the brake system 10 and/or the controller 48 may determine or conclude that the inrush has been satisfied and that the motor 36 is operating in a current free running range $I_0$. Step 108 may also be referred to as masking the inrush or inrush mask. Determining or concluding that the inrush has been satisfied may satisfy one or more of the release criteria of step 106.

The amount of time required to satisfy step 108 for the inrush mask may be configured to change over time or may update itself based on a previous motor characteristic reading or determination, which may be advantageous for compensating for motor 36 or actuator 24 wear and/or decrease in efficiency of the brake system 10. For example, as the motor 36 and/or actuator 24 wear over time, it may take longer for the motor 36 to achieve the free running current stage $I_0$ 116, compared to when the motor 36 and/or actuator 24 is new. Therefore, by updating the amount of time in step 108 for the inrush to be satisfied (i.e., for the current draw to go from 114 to 116 in FIG. 5), the method 100, the brake system 10 and/or the controller 48 have better chances of determining or concluding the inrush is actually satisfied.

Step 110 may start or occur simultaneously with step 108, or step 110 may start during or after step 108 is complete or satisfied.

In or during step 110, the method 100, the brake system 10 and/or the controller 48 is configured to determine or evaluate whether one or more release criteria are satisfied. This step 110 may include: determining whether a motor current draw of the motor 36 has met or exceeded a predetermined threshold; determining whether a change in the motor current draw of the motor 36 has met or exceeded a predetermined threshold; determining whether a motor voltage drop of the motor 36 has met or exceeded a predetermined threshold; determining whether a change in the motor voltage drop of the motor 36 has met or exceeded a predetermined threshold; or a combination thereof.

During step 110, the inrush 114 from step 108 is masked or not considered. During step 110, the motor 36 is operating in the current running range $I_0$ 116, which means the motor is rotating the spindle 26 in the release direction and the nut 28 is moving axially in the release direction 52 towards the spindle stop 52. During the running current range $I_0$ 116, the nut stop 54 is not yet in contact with the spindle stop 56.

The nut stop 54 will contact the spindle stop 56 at the end of the running current range $I_0$ 116. After the nut stop 54 and spindle stop 56 make contact, a torque load on the motor 36 will increase, which will cause the motor current draw to increase, which is identified at 118. After the current draw reaches or exceeds a predetermined threshold or value, identified at 120, the method 100, the brake system 10 and/or the controller 48 determines or concludes that the nut stop 54 and spindle stop 52 are in contact. This determination or conclusion may satisfy one of the release criteria. After the brake system 10 and/or the controller 48 determines or concludes that the nut stop 54 and spindle stop 52 are in contact, the method 100, the brake system 10, and/or the controller 48 may turn the motor 36 OFF.

Additionally, or alternatively, step 110 may require a change in the motor current draw to reach or exceed a predetermined value. That is, after the method 100, the brake system 10 and/or the controller 48 determines or concludes the motor 36 is operating in the current running range $I_0$ 116, the spindle 26 may continue rotating until a change in the current draw $i(k)-I_0$ from the running current range $I_0$ meets or exceeds a predetermined value or threshold. This is illustrated at 122. This type of determination or evaluation may be desirable to overcome a situation where the free running current range $I_0$ changes over time due to wear or degradation of the actuator 24 and/or motor 36 over time. After the change in the current draw $i(k)-I_0$ reaches or exceeds the predetermined threshold or value 122, the method 100, the brake system 10 and/or the controller 48 determines or concludes that the nut stop 54 and spindle stop 52 are in contact. This determination or conclusion may satisfy one of the release criteria. After the brake system 10 and/or the controller 48 determines or concludes that the nut stop 54 and spindle stop 52 are in contact, the method 100, the brake system 10, and/or the controller 48 may turn the motor 36 OFF.

Additionally, or alternatively, step 110 may monitor or evaluate the voltage $U_0$, which may be directly, inversely proportional to the current draw. After the method 100, the brake system 10 and/or the controller 48 determines or concludes that the voltage $U_0$ has reached or exceeded a predetermined value or threshold, identified at 124, the method 100, the brake system 10 and/or the controller 48 may determine or conclude that the nut stop 54 and spindle stop 52 are in contact. This determination or conclusion may satisfy one of the release criteria.

Additionally, or alternatively, step 110 may require a change in the voltage drop $(U_0-U(k))$ identified at 127 to reach or exceed a predetermined value. That is, the spindle 26 may continue rotating until a change in the voltage drop $(U_0-U(k))$ from the free running voltage $U_0$ meets or exceeds a predetermined value or threshold. This type of determination or evaluation may be desirable to overcome a situation where the voltage $U_0$ changes over time due to wear or degradation of the actuator 24 and/or motor 36 over time. After the change in the voltage drop ($U_0$–U(k)) 124 meets or exceeds a predetermined threshold or value, the method 100, the brake system 10 and/or the controller 48 determines or concludes that the nut stop 54 and spindle stop 52 are in contact. This determination or conclusion may satisfy one of the release criteria.

After one or more of the release criteria is satisfied, the method 100 moves to step 126. After step 126 is satisfied (by way of satisfying both steps 108 and 110, the method 100 moves to step 128. However, as was discussed above, step 112 may occur simultaneously with step 108 and/or simultaneously with step 110.

Step 112 includes a timeout. During or after the method 100 enters step 106, a clock or timer associated with the brake system 10 or controller 48 is activated. This step 112 is provided in case the inrush 114 is not satisfied at step 108 (i.e., if the motor 36 does not turn ON, for example) and/or the release criteria is not satisfied in step 110 (i.e., if the current and/or voltage criteria are not satisfied), the method 100, the brake system 10 and/or the controller 48 can rely on step 112 to move to step 128. If the timer in step 112 meets or exceeds a predetermined timer threshold, the method 100 proceeds to stop 128.

At step 128, regardless if the step 128 is reached by satisfying both steps 108 and 110, or by satisfying step 112, the method 100 proceeds to step 130 where it is determined that the actuator 24 is in the retracted position and/or that the nut stop 54 is in contact with the spindle stop 56. Accordingly, at step 130, the motor 36 ceases to generate and/or supply torque to the spindle 26; the motor 36 is turned OFF; the spindle 26 ceases to rotate; and/or the nut 28 ceases to move axially along a length of the spindle 26. After the actuator 24 is in the retracted position, the brake system 10, the actuator 24, the brake piston 20, the brake pads 14, 16, or a combination thereof can be serviced and/or replaced.

Figure 6:
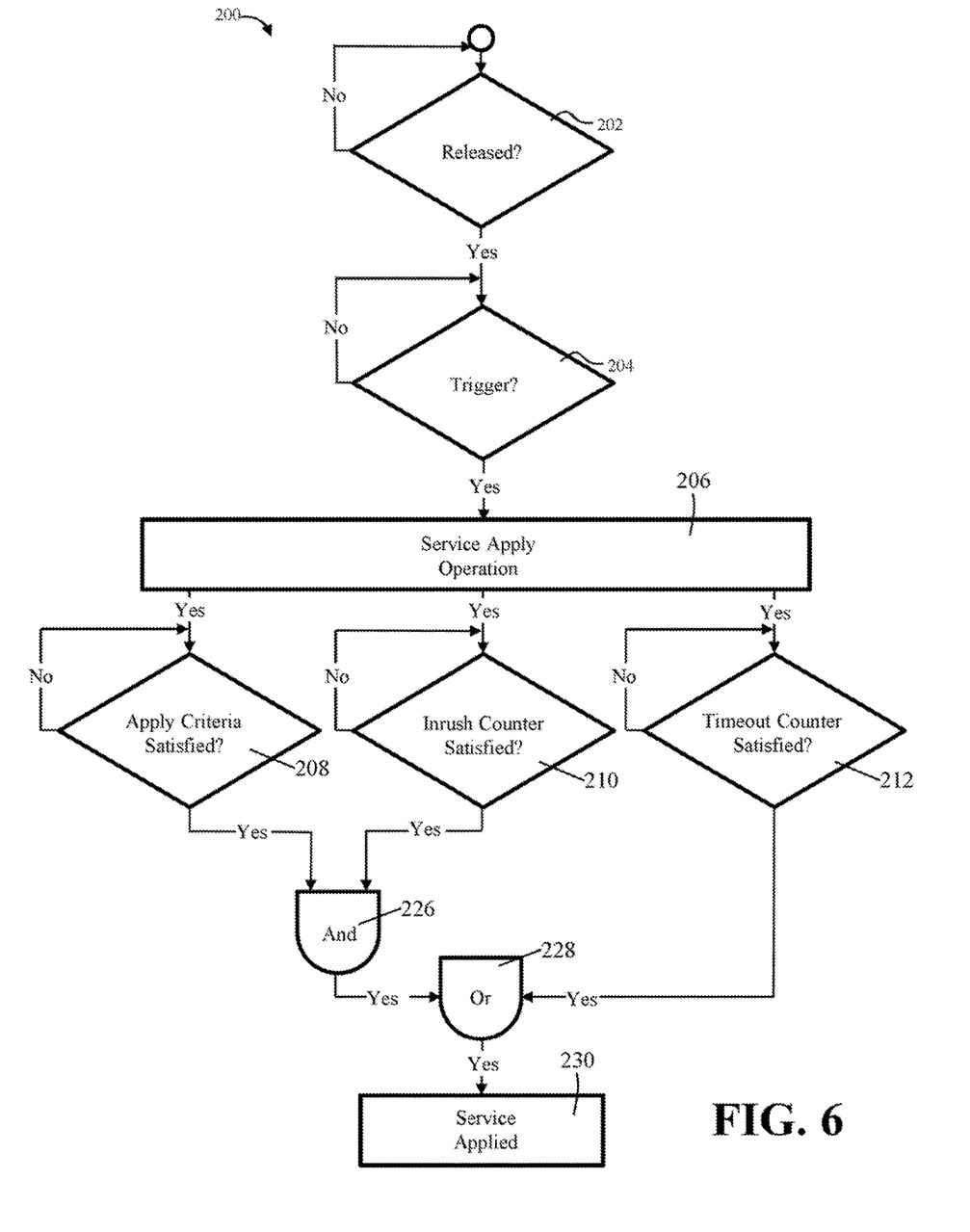
FIG. 6 is a flow chart illustrating a method of controlling a brake system

A method 200 can be used to move the brake system 10 and/or actuator 24 to an extended position. In the extended position, a gap G1 may be defined between the nut stop 54 and the spindle stop 56 (FIG. 1) and/or the forward end 42 of the nut 28 may be in contact with a wall 40 of the piston pocket 22. In the extended position, the brake piston 20 may be in contact with the brake piston 14 and/or may apply a pressing force onto the brake piston. In the extended position, one or both of the brake pads 14, 16 may be in contact with the brake rotor.

For example, the method 200 can be used to return the brake system 10 and/or actuator 24 to an extended position after the brake system 10, the actuator 24, the brake piston 20, the brake pads 14, 16, or a combination thereof have been serviced and/or replaced.

The method 200 can be used to determine if or when the forward end 42 of the nut 28 is in contact with a wall 40 of the piston pocket 22. The method 200 may be performed or executed by the brake system 10 and/or the controller 48.

The method 200 includes a step 202. At step 202, the method 200, the brake system 10 and/or the controller 48 are configured to determine whether the brake system 10 is in a released state 202. In the released state 202, the motor 36 is turned OFF, is not generating torque, is not supplying torque to the spindle 26 or actuator 24, or a combination thereof. In the released state 202, the spindle 26 is not rotating. In the released state 202, the brake system 10 is not generating a clamping force. In the released state 202 of method 200, the nut stop 54 may be in contact with the spindle stop 56.

If the method 200, the brake system 10 and/or controller 48 determines that the brake system 10 is not in the released state 202, the method 200, the brake system 10 and/or the controller 48 is configured to perform one or more steps, functions, or processes to put the brake system 10 into the released state. For example, the method 200, the brake system 10 and/or the controller 48 may be configured to turn the motor 36 OFF, stop rotating the spindle 26, move the nut stop 54 into contact with the spindle stop 56 (i.e., using method 100), or a combination thereof. After the method 200, the brake system 10 and/or the controller 48 determines that the brake system 10 is in the released state, the method 200 proceeds to step 204.

The method 200 includes a step 204. At step 204, the method 200, the brake system 10 and/or the controller 48 looks for a trigger. The trigger may be required for the method 200 to move to the next step 206. The trigger may include one or more steps or a sequence of steps that are performed by a user or technician. The trigger may be pre-set or defined by the OEM. For example, the trigger may include one or more steps or deliberate acts like moving the ignition key into a particular position (i.e., into the ON or auxiliary position, for example); depressing the brake pedal or pumping the brake pedal a certain number of times; depressing the gas pedal or pumping the gas pedal a certain number of times; depressing or activating one or more switches or buttons a certain number of times (for example, the parking brake switch); or a combination thereof. The method 200, the brake system 10 and/or the controller 48 will wait until the trigger has been received before moving to step 206.

After the trigger has been received in step 204, the method 200 proceeds to the service apply step 206. In or during the service apply step 206, the method 200, the brake system 10 and/or the controller 48 may be configured to turn ON the motor 36 so that the motor 36 begins generating torque. In or during the service apply step 206, the torque from the motor 36 may be supplied or provided to the actuator 24 or to the spindle 26. The torque from the motor 36 is configured to cause the spindle 26 to rotate in the apply direction, which causes the nut 28 to axially move in the apply direction 50 away from the spindle stop 56.

As part of the service apply step 206, the method 200 includes a step 208 of determining whether inrush current has been satisfied; a step 208 of determining whether or more apply criteria have been satisfied; and a step 212 of determining whether a timeout been satisfied.

As will be discussed further below, both steps 208 and 210 must be satisfied at step 226 before the method 200 will proceed to the step 228. Alternatively, the method 200 may proceed to the step 228 if the step 212 is satisfied before both steps 208, 210 are satisfied.

During the service apply operation 206, the brake system 10 and/or controller 48 is configured to monitor the motor 36 and the one or more motor characteristics of the motor 36.

Figure 7:
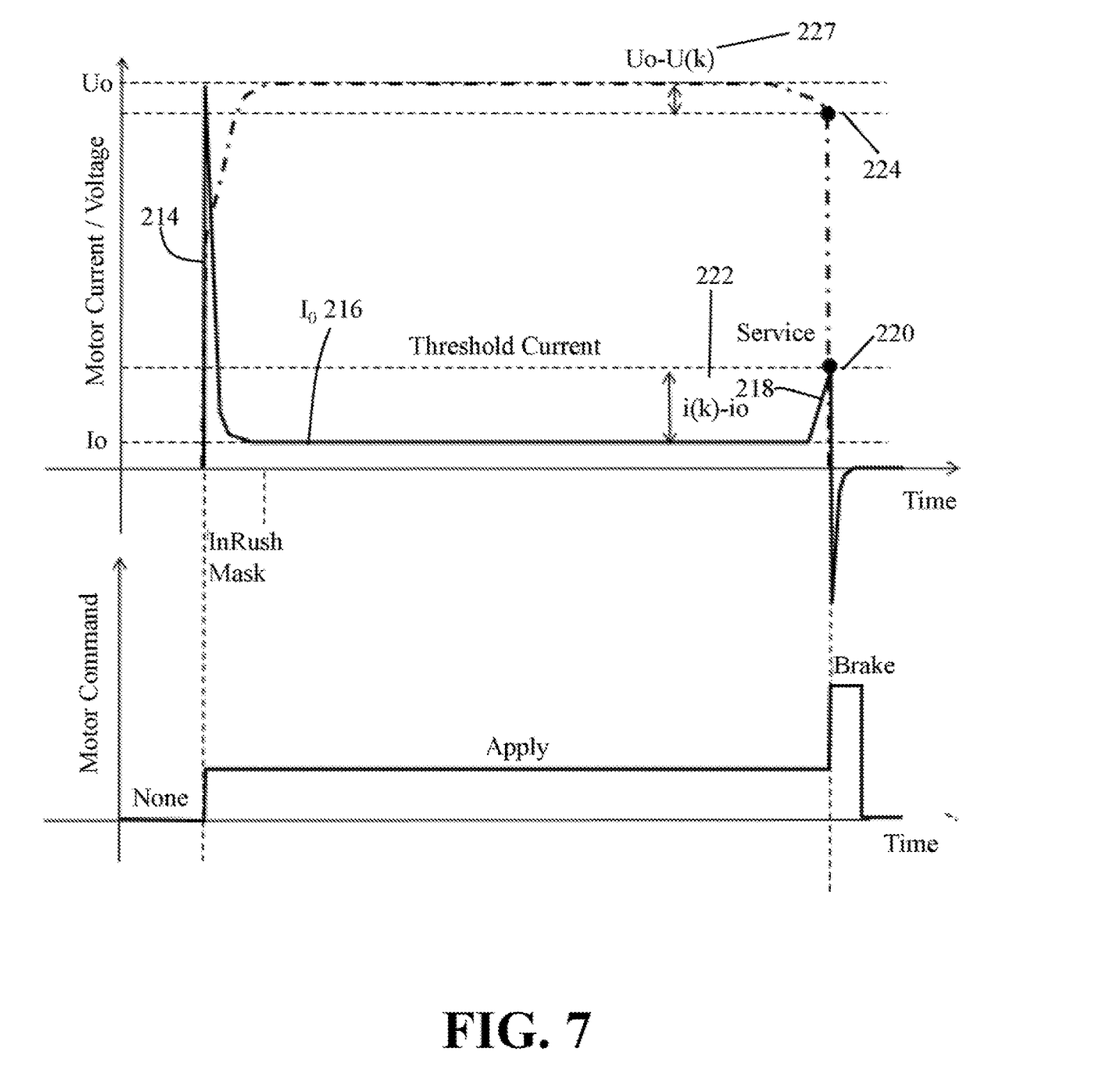
FIG. 7 is a graph illustrating motor characteristics during the controlling of a brake system with the method of FIG. 6.

With additional reference to FIGS. 3 and 7, to generate torque when or after the motor 36 is initially turned ON, the motor 36 may draw or require an inrush of current, which may cause the current to increase or spike, which is illustrated at 214 in FIG. 7. The inrush current is a surge or maximum instantaneous input current drawn by the motor 36 when the motor 36 is first turned ON.

After the motor 36 begins generating torque and rotating the spindle 26 in the apply direction, the current draw may drop to a current running range $I_0$, which is identified at 216 in FIG. 7. While the motor 36 draws current in the current running range $I_0$ 216, the spindle 26 is being rotated in the apply direction, and the nut 28 is being moved in the apply direction 50 away from the spindle stop 56.

At step 208, the method 200, the brake system 10 and/or the controller 48 is configured to determine when or whether the inrush has ended or has been satisfied (i.e., when or whether the current draw has dropped from the inrush 214 to the current running range $I_0$ at 216). This decision or determination may be time based. That is, the brake system 10 and/or the controller 48 may comprise a clock or timer that is configured to begin running after the motor 36 is initially turned ON at step 206. After a predetermined amount of time or a threshold time has expired after the motor 36 is turned ON, the method 200, the brake system 10 and/or the controller 48 may determine or conclude that the inrush has been satisfied and that the motor 36 is operating in a current running range $I_0$ at 216. Step 208 may also be referred to as masking the inrush or inrush mask. Determining or concluding that the inrush has been satisfied may satisfy one or more of the release criteria of step 206.

The amount of time in step 208 may be configured to change over time or may update itself based on a previous motor characteristic reading or determination, which may be advantageous for compensating for motor 36 or actuator 24 wear and/or decrease in efficiency of the brake system 10. For example, as the motor 36 and/or actuator 24 wear over time, it may take longer for the motor 36 to achieve the running current stage $I_0$ 216, compared to when the motor 36 and/or actuator 24 is new. Therefore, by updating the amount of time in step 208 for the inrush to be satisfied (i.e., for the current draw to go from 214 to 216 in FIG. 7), the method 200, the brake system 10 and/or the controller 48 have better chances of determining or concluding the inrush is satisfied.

Step 210 may start or occur simultaneously with step 208, or step 210 may start during or after step 208 is complete or satisfied.

In or during step 210, the method 200, the brake system 10 and/or the controller 48 is configured to determine or evaluate whether or more release criteria are satisfied. This step 210 may include: determining whether a motor current draw of the motor 36 has met or exceeded a predetermined threshold; determining whether a change in the motor current draw of the motor 36 has met or exceeded a predetermined threshold; determining whether a motor voltage drop of the motor 36 has met or exceeded a predetermined threshold; determining whether a change in the motor voltage drop of the motor 36 has met or exceeded a predetermined threshold; or a combination thereof.

During step 210, the inrush 214 from step 208 is masked or not considered. During step 210, the motor 36 is operating in the current running range $I_0$ 216, which means the motor 36 is rotating the spindle 26 in the apply direction and the nut 28 is moving axially in the apply direction 50 away from the spindle stop 52. During the running current range $I_0$ 216, the leading end 42 of the nut 28 is not yet in contact with a bottom pocket wall 40 of the piston pocket 22 of the brake piston 20.

The leading end 42 of the nut 28 will contact the bottom pocket wall 40 of the piston pocket 22 of the brake piston 20 at the end of the running current range $I_0$ 216. After the leading end 42 of the nut 28 and the bottom pocket wall 40 of the piston pocket 22 make contact, a torque load on the motor 36 will increase, which will cause the motor current draw to increase, which is identified at 218. After the current draw reaches or exceeds a predetermined threshold or value, identified at 220, the method 200, the brake system 10 and/or the controller 48 determines or concludes that the leading end 42 of the nut 28 and the bottom pocket wall 40 of the piston pocket 22 are in contact. This determination or conclusion may satisfy one of the apply criteria. After the brake system 10 and/or the controller 48 determines or concludes that the leading end 42 of the nut 28 and the bottom pocket wall 40 of the piston pocket 22 are in contact, the method 200, the brake system 10, and/or the controller 48 may turn the motor 36 OFF.

Additionally, or alternatively, step 210 may require a change in the motor current draw to reach or exceed a predetermined value. That is, after the 200, the brake system 10 and/or the controller 48 determines or concludes the motor 36 is operating in the current running range $I_0$ 216, the spindle 26 may continue rotating until a change in the current draw $i(k)-I_0$ from the running current range $I_0$ meets or exceeds a predetermined value or threshold. This is illustrated at 222. This type of determination or evaluation may be desirable to overcome a situation where the running current range $I_0$ changes over time due to wear or degradation of the actuator 24 and/or motor 36 over time. After the change in the current draw reaches or exceeds a predetermined threshold or value, identified at 222, the method 200, the brake system 10 and/or the controller 48 determines or concludes that the leading end 42 of the nut 28 and the bottom pocket wall 40 of the piston pocket 22 are in contact. This determination or conclusion may satisfy one of the release criteria.

Additionally, or alternatively, step 210 may monitor or evaluate the voltage $U_0$, which may be directly, inversely proportional to the current draw. After the method 200, the brake system 10 and/or the controller 48 determines or concludes that the voltage $U_0$ has reached or exceeded a predetermined value or threshold, identified at 224, the method 200, the brake system 10 and/or the controller 48 may determine or conclude that the leading end 42 of the nut 28 and the bottom pocket wall 40 of the piston pocket 22 are in contact. This determination or conclusion may satisfy one of the release criteria.

Additionally, or alternatively, step 210 may require a change in the voltage drop $(U_0-U(k))$ identified at 226 to reach or exceed a predetermined value. That is, the spindle 26 may continue rotating until a change in the voltage drop $(U_0-U(k))$ from the free running voltage $U_0$ meets or exceeds a predetermined value or threshold. This type of determination or evaluation may be desirable to overcome a situation where the voltage $U_0$ changes over time due to wear or degradation of the actuator 24 and/or motor 36 over time. After the change in the voltage drop $(U_0-U(k))$ 124 meets or exceeds a predetermined threshold or value, the method 200, the brake system 10 and/or the controller 48 determines or concludes that the leading end 42 of the nut 28 and the bottom pocket wall 40 of the piston pocket 22 are in contact. This determination or conclusion may satisfy one of the release criteria.

In some configurations, rather than the method 200, the brake system 10 and/or the controller 48 relying on contact between the leading end 42 of the nut 28 and the bottom pocket wall 40 of the piston pocket 22 for the apply criteria, the method 200 may be configured to continue to rotate the spindle 26 in the apply direction after the leading end 42 of the nut 28 and the bottom pocket wall 40 of the piston pocket 22 make contact until the brake piston 20 contacts the pressure plate of the inboard brake piston 14, which may occur at the end of the current running range $I_0$ 216. After contact is made between the brake piston 20 and the pressure plate of the inboard brake piston 14, the torque load on the motor 36 may increase, and the increase and/or change in current and/or the decrease and/or change in voltage may be monitored to determine that the brake piston 20 is in contact with the brake pad 14, which may occur at 220.

In some configurations, rather than the method 200, the brake system 10 and/or the controller 48 relying on contact between the brake piston 20 and the brake pad 14 for the apply criteria, the method 200 may be configured to continue to rotate the spindle 26 in the apply direction after the leading end 42 of the nut 28 and the bottom pocket wall 40 of the piston pocket 22 make contact and after the brake piston 20 and the brake pad 14 make contact until the brake piston 20 pushes the brake pad 14 into contact with the braking surface or brake rotor, which may occur at the end of 216 and the beginning of 218. After contact is made between the brake pad 14 and the brake rotor, the torque load on the motor 36 may increase, and the increase and/or change in current and/or the decrease and/or change in voltage may be monitored to determine that the brake pad 14 is in contact with the brake rotor which may occur at 220.

After one or more of the release criteria is satisfied, the method 200 moves to step 226. After step 226 is satisfied (by way of satisfying both steps 208 and 210), the method 200 moves to step 228. However, as was discussed above, step 212 may occur simultaneously with step 208 and/or simultaneously with step 210.

Step 212 includes a timeout. During or after the method 200 enters step 206, a clock or timer associated with the brake system 10 or controller 48 is activated. In case the inrush is not satisfied at step 208 and/or the release criteria is not satisfied in step 210 (i.e., if the motor 36 does not turn ON, for example), and/or the release criteria is not satisfied in step 210 (i.e., if the current and/or voltage criteria are not satisfied), the method 200, the brake system 10 and/or the controller 48 can rely on step 212 to move to step 228. If the timer in step 212 meets or exceeds a predetermined timer threshold, the method 102000 proceeds to stop 228.

At step 228, regardless if the step 228 is reached by satisfying both steps 208 and 210, or by satisfying step 212, the method 200 proceeds to step 230 where it is determined that the actuator 24 is in the extended position and/or that the leading end 42 of the nut 28 and the bottom pocket wall 40 of the piston pocket 22 are in contact and/or that the brake pad 14 and/or 16 are in contact with the brake rotor. Accordingly, at step 230, the motor 36 ceases to generate and/or supply torque to the spindle 26; the motor 36 is turned OFF; the spindle 26 ceases to rotate; and/or the nut 28 ceases to move axially along a length of the spindle 26. The method 200 may then include a step where the motor 36 is rotated slightly in the release direction where the nut 28 is moved in the release direction 52 so that the nut 28 moves out of contact with the brake piston 20 (and/or ceases to apply a pressing force on the brake piston 20) and the brake piston 20 moves out contact with the brake pad 14 (and/or ceases to apply a pressing force on the piston 14) so that the brake rotor or brake drum can be moved or rotated.

It is understood that the following method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A method comprising:
monitoring a motor characteristic of a motor;
moving an actuator of a brake system comprising a spindle and a nut into a retracted position, the nut comprises a finger that projects axially a back end of the nut in a direction of the spindle, the retracted position is where the finger of the nut is in contact with the spindle, and
determining the actuator has reached the retracted position after the motor characteristic has reached or exceeded a predetermined threshold.

2. The method of claim 1, wherein the actuator is a ball nut assembly or a lead screw.

3. The method of claim 1, wherein the spindle comprises a spindle stop that is a projection that axially extends from the spindle in a direction of the nut, the retracted position being when the finger of the nut contacts the projection or a finger of the spindle.

4. The method of claim 1, wherein the motor characteristic is current draw by the motor or is a change in the current draw by the motor.

5. The method of claim 1, wherein the motor characteristic is a voltage drop of the motor or is a change in the voltage drop of the motor.

6. The method of claim 1, wherein the method comprises masking an inrush current of the motor.

7. The method of claim 1, wherein the method comprises updating the predetermined threshold over time.

8. A method of servicing a brake system comprising:
monitoring a motor characteristic of a motor;
moving an actuator comprising a spindle and a nut into a retracted position, the nut comprises a finger that projects axially from a rear end of the nut in a direction of the spindle and the spindle comprises a finger that projects axially from the spindle in a direction of the nut, and the retracted position is when the finger of the nut is in contact with the finger of the spindle,
determining the actuator has reached the retracted position after the motor characteristic has reached or exceeded a predetermined threshold.

9. The method of claim 8, wherein the motor characteristic is a measured current draw by the motor or a change in a current draw by the motor.

10. The method of claim 8, wherein the motor characteristic is a measured voltage drop of the motor or is a change in a voltage drop of the motor.

11. The method of claim 8, wherein the method comprises masking an inrush current of the motor.

12. The method of claim 8, wherein the method comprises updating the predetermined threshold.

13. The method according to claim 8, wherein the rear end of the nut comprises a planar surface.

14. The method according to claim 8, wherein the actuator is a lead screw or a ball nut assembly.

15. A method of servicing a brake system comprising:
moving an actuator of the brake system into a retracted position until a torque load acting on a motor is increased;
monitoring a motor characteristic of the motor; and
determining the actuator has reached the retracted position after the motor characteristic has reached or exceeded a predetermined threshold,
wherein the motor characteristic is a current draw by the motor, and
wherein the actuator comprises a spindle and a nut, the nut comprises a finger that projects axially from a back end of the nut in a direction of the spindle, the retracted position is where the finger contacts an adjacent feature of the brake system.

16. The method of claim 15, wherein the spindle comprises a finger that axially extends from the spindle in a direction of the nut, and
wherein in the retracted position, the finger of the nut is in contact with the finger of the spindle.

17. The method of claim 15, wherein the actuator comprises a lead screw or a ball nut assembly.

18. The method of claim 15, wherein the spindle is rotated by the motor causing the nut to move.

* * * * *